Nov. 27, 1923.

W. F. KEENAN, JR 1,475,705

SAFETY JOINT FOR HIGH PRESSURE GAS APPARATUS

Filed Sept. 10, 1920    2 Sheets-Sheet 2

Walter F. Keenan, Jr. INVENTOR

BY Kerr, Page, Cooper & Hayward
ATTORNEYS

Patented Nov. 27, 1923.

1,475,705

UNITED STATES PATENT OFFICE.

WALTER FRANCIS KEENAN, JR., OF NEW YORK, N. Y., ASSIGNOR TO POWER SPECIALTY COMPANY, OF NEW YORK, N. Y., A CORPORATION OF NEW YORK.

SAFETY JOINT FOR HIGH-PRESSURE GAS APPARATUS.

Application filed September 10, 1920. Serial No. 409,386.

*To all whom it may concern:*

Be it known that I, WALTER F. KEENAN, Jr., being a citizen of the United States, residing at New York, in the county and State of New York, have invented certain new and useful Improvements in Safety Joints for High-Pressure Gas Apparatus, of which the following is a full, clear, and exact description.

In a process of producing ammonia which has heretofore been practised, one step involves the heating to a high temperature of hydrogen gas under pressure. This gas, as is well known, is extremely difficult to confine and control under such conditions. Few materials, suitable for containers, are fully impervious to its passage, and when tubes or pipes are used for conveying it the greatest care must be exercised in forming and in maintaining the perfect integrity of the joints, as the gas is very liable to leak through them, and when it does, it becomes a source of danger owing to its highly inflammable character in air.

The general type of apparatus used for heating the gas under pressure comprises a furnace, generally heated by an oil or gas flame, to the flame box of which is connected a suitable chamber or passage for the heated products of combustion, and in this chamber or passage is a bank of tubes, over which the hot gases sweep and through which the gas under the proper pressure is passed.

The invention which forms the subject of this application for Letters Patent is concerned with this portion of the apparatus and involves the construction and the arrangement of the said tubes, the provision therefor of special and novel joints and a means for protecting the joints against impairment and for preventing the possibility of explosion in the event of leakage thereat which are more fully set forth hereinafter. The invention is applicable to apparatus for heating any other than hydrogen gas, as will be understood.

In general terms the improvement resides in a bank of tubes of special material arranged in the passage for hot gases and constructed with as few joints as practical conditions of use will permit. These joints, when and where required, are disposed in a chamber insulated or apart from the heating chamber. The joints are of special and novel character, and are protected to resist the effects of expansion and contraction under varying temperatures and are equipped with means for leading off any gas that may leak or escape through them into the atmosphere where it may be dissipated or burned as a flame and not allowed to collect in any quantity and mix with air.

This improvement is illustrated in the accompanying drawing, in which—

Figure 1:
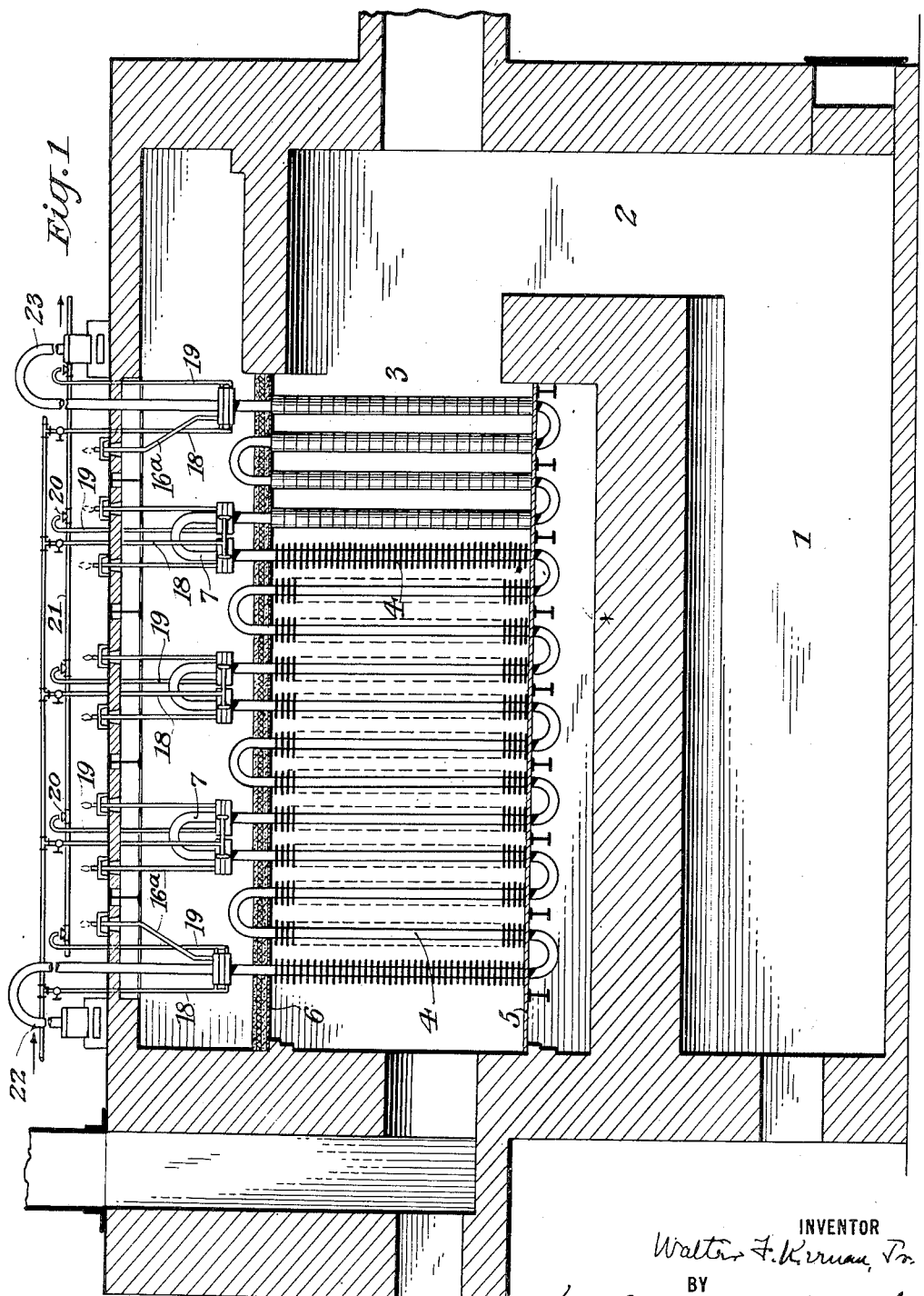
Fig. 1 is a longitudinal sectional view of the heating apparatus, the pipes or tubes being shown in elevation.

The furnace is or may be of conventional form, character and material. I prefer, however, to build it with a flame chamber 1, having a vertical passage 2 leading to an upper and parallel chamber 3 for the bank of tubes. By this means the tubes are protected from the direct action of the flame and are, therefore, less liable to burn out or become injured.

The tubes 4 are in a bank in this upper chamber or passage for hot gases. Their bends are above and below partitions 5 composed of cast iron plates and 6 composed of cast iron plates with layers of insulating material, and that portion of the tubes which lies between these partitions and is exposed to the flow of hot gases is enclosed in casings of cast iron rings, to secure a greater heat absorbing surface. The tubes nearest the fire and where the temperature is highest have plain rings, as shown, but those more remote from the source of heat have corrugated rings of the well known Foster type to give increased heat absorbing surface.

Figure 2:
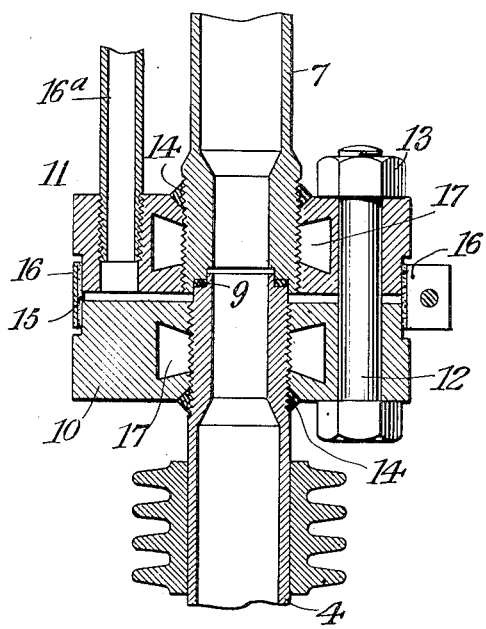
Fig. 2 is a central vertical section of my improved joint.
Figure 3:
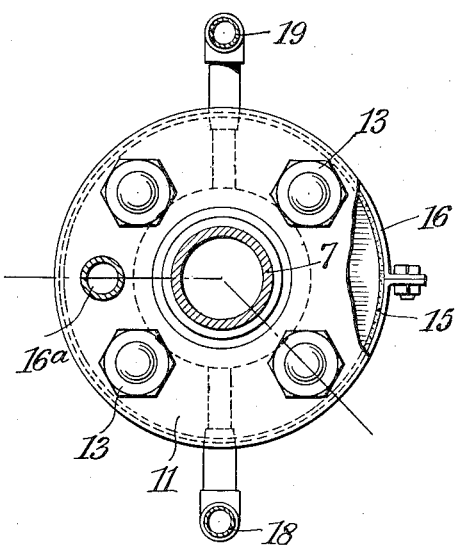
Fig. 3 is an end view of the same with the tube in section.
Figure 4:
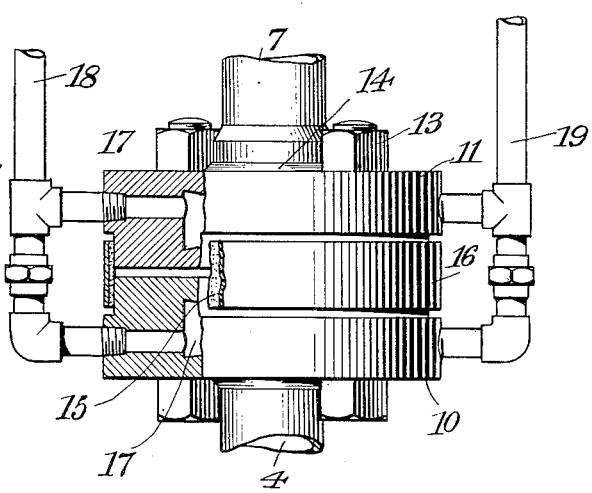
Fig. 4 is a side view in elevation and part section of the same joint.

The tubes are composed of chrome vanadium steel, which is extremely hard and dense and practically impervious to hot hydrogen gas under the pressure which this process demands. They are made with as few joints as practical conditions permit, each section for this purpose being composed of three continuous bends, but where joints are required I make them and protect them as shown in Figs. 2, 3 and 4.

In these figures, 4 designates the encased and heat absorbing section of pipe, and 7 the bend above the joint. The end of section 4 is upset or thickened internally so as not to interfere with stringing the corrugated rings thereon, and externally threaded as shown, and the end is formed as a male member with a short flange of reduced diameter and thickness surrounded by a shoulder. The end of the other section 7 is similarly upset and thickened externally as well as internally and threaded externally and is formed with a flange back of which is a double shoulder to constitute a female member.

When a joint is formed the ends of the two sections are brought together and a gasket 9 of a material not affected by hydrogen, such as copper, silver or preferably nickel, laid between the shoulders at the two ends. Over each threaded and abutting end is then screwed a flange 10, 11, of such thickness as to resist tendency to flexure when tightened, and having four circular openings through which bolts 12 are passed and by suitable tools brought closely but not completely together by nuts of Monel metal 13. These latter are tightened to make the joints between the tubes as tight as possible, as and it will be observed that there is no direct longitudinal pressure upon the flanges of either tube.

After this has been done flanges are welded to the tubes as indicated at 14, to lock the threads and form a homogeneous structure with both flange and tube, and the space between the flanges 10 and 11, which it will be understood is quite small, is then enclosed by a band 15 of asbestos, which is firmly clamped down by a metal band 16 with end projections and joined by nuts and bolts or otherwise. A tightly closed chamber is thus formed around the joined ends of the tubes.

In practice the flanges are threaded and welded to the tube and the faces machined before the heaters are assembled, so that the only field operation consists in putting in the gaskets, tightening up the bolts, and then applying the asbestos and metal bands.

The joints thus formed are perfectly gastight, every precaution having been taken to make them so, but hydrogen under pressure is liable to escape through even the best of joints if for any reason it became at all impaired as by accident, and it may and in fact does sometimes escape even in the case of the joint made as above described, under such circumstances. Were no provision made for such contingency, the accumulating gas would possibly explode, or the escaping gas become ignited, producing a hot and cutting flame that would quickly destroy any part with which it might come in contact. I therefore drill through one of the flanges as 11, a hole into this chamber and insert a tube 16ª therein which is carried up through the top of the furnace structure and into the atmosphere.

By this means any gas that may leak through the joint passes from the surrounding chamber to the outer air, where it may be simply dissipated or burned as a steady flame.

It will be observed that the gas passing through the tubes and joints is at a very high temperature and the ends of the tubes become highly heated imparting their heat to the flanges 10 and 11. Such heat necessarily causes the flanges to expand, and on a drop in temperature the joints normally closed by them may become impaired. It therefore becomes highly important to prevent, as far as possible, this excessive heating of the flanges with the attendant expansion, and for this purpose I cut in the flanges annular grooves 17 to form water channels, and connect therewith tubes 18, Fig. 4, leading from a water supply, and tubes 19, leading out of the furnace to drip cup 20 in a waste pipe 21. In the use of the apparatus a flow of water is thus maintained through each flange 10 or 11, and these parts are thereby prevented from becoming overheated.

In the operation of this apparatus hydrogen gas under the proper pressure is admitted through the tubes 22, Fig. 1, to rows of heat absorbing tubes constituting the bank. It passes through these tubes to outlet tubes 23, the flow of the gas being thus counter to the flow of hot gases from the fire.

If gas escapes through the outlets provided therefor, its amount may readily be determined by the character of the flame. The flow of water may also be regulated and controlled by observing the temperature of that issuing from the outlet pipes. If it should be shown that an undue proportion of gas was leaking from any joint, that joint may be tightened up readily by tightening nuts 13 on the bolts 12.

As I have previously stated, I prefer to use nickel for the gaskets 9. I also use chrome vanadium steel for the tubes conveying the gas to be heated, as this metal is impervious to the gas. I prefer to use Monel metal for the nuts 13, as this metal under excessive variations of temperature will not oxidize and freeze to the bolts 12.

What I claim is—

1. In an apparatus of the kind described, a tube joint composed of the following combination of parts: tube ends forming a male and female coupling, a gasket between the two abutting ends, flanges threaded over the externally threaded tube ends, bolts and nuts for drawing the flanges together until a gas tight joint between the abutting tube ends is formed, a ring member about said flanges, a closed annular chamber formed in and by the flanges and ring member and surrounding the abutting tube ends, and a pipe from the same to the atmosphere through which gas that may leak through the joint will be carried off and disposed of.

2. The combination with the abutting and interengaging male and female upset ends of two tube sections, a gasket interposed between the internal shoulders of such ends, flanges threaded over the said ends and of such dimension or strength as to resist flexure when drawn together, bolts passing through said flanges and nuts for drawing the tube ends together to form a gas tight joint, but leaving a space between said flanges surrounding the meeting ends of the tube sections, means for closing said space to form a chamber and a pipe leading therefrom to the outer air through which any inflammable gas that may leak through the joint may be carried off and safely disposed of.

3. The combination with the abutting and interengaging male and female ends of two tube sections of an interposed gasket, flanges threaded over the ends of said sections, bolts and nuts for drawing the flanges together and thus forming a gas tight joint between the abutting ends of the tube sections, said flanges having internal annular channels therein closed by the tube ends and pipes connected therewith through which a flow of water may be maintained through the channels in order to cool the flanges and prevent their undue expansion as a result of the heat of the tube sections.

4. The combination with the abutting and upset ends of two tube sections formed as a male and female joint, a gasket interposed between the abutting surfaces of said sections, flanges engaging the said tube ends, means for drawing said flanges towards but not in contact with each other to form a gas tight joint between the tube sections, an asbestos and enclosing metal band over the loose joint between the flanges forming thereby a closed chamber and a pipe leading from such chamber by which any gas that may leak through the joint may be carried off and safely disposed of.

5. The combination with the abutting ends of two tube sections of flanges engaging said ends and means for drawing the flanges towards each other to form a gas tight joint between the abutting ends before said flanges are in actual contact, means for enclosing and forming the space between the flanges into a closed annular chamber, a pipe leading therefrom to the outer air through which any gas that may leak through the joint may be safely disposed of, annular grooves or channels through said flanges and means for maintaining a flow of cooling water through the same.

In testimony whereof I hereto affix my signature.

WALTER FRANCIS KEENAN, Jr.